Oct. 27, 1959 J. S. LINN 2,910,638
SPEED CONTROL SYSTEM
Filed July 15, 1957 3 Sheets-Sheet 1

INVENTOR.
Jerome S. Linn
By Smyth & Roston
Attorneys,

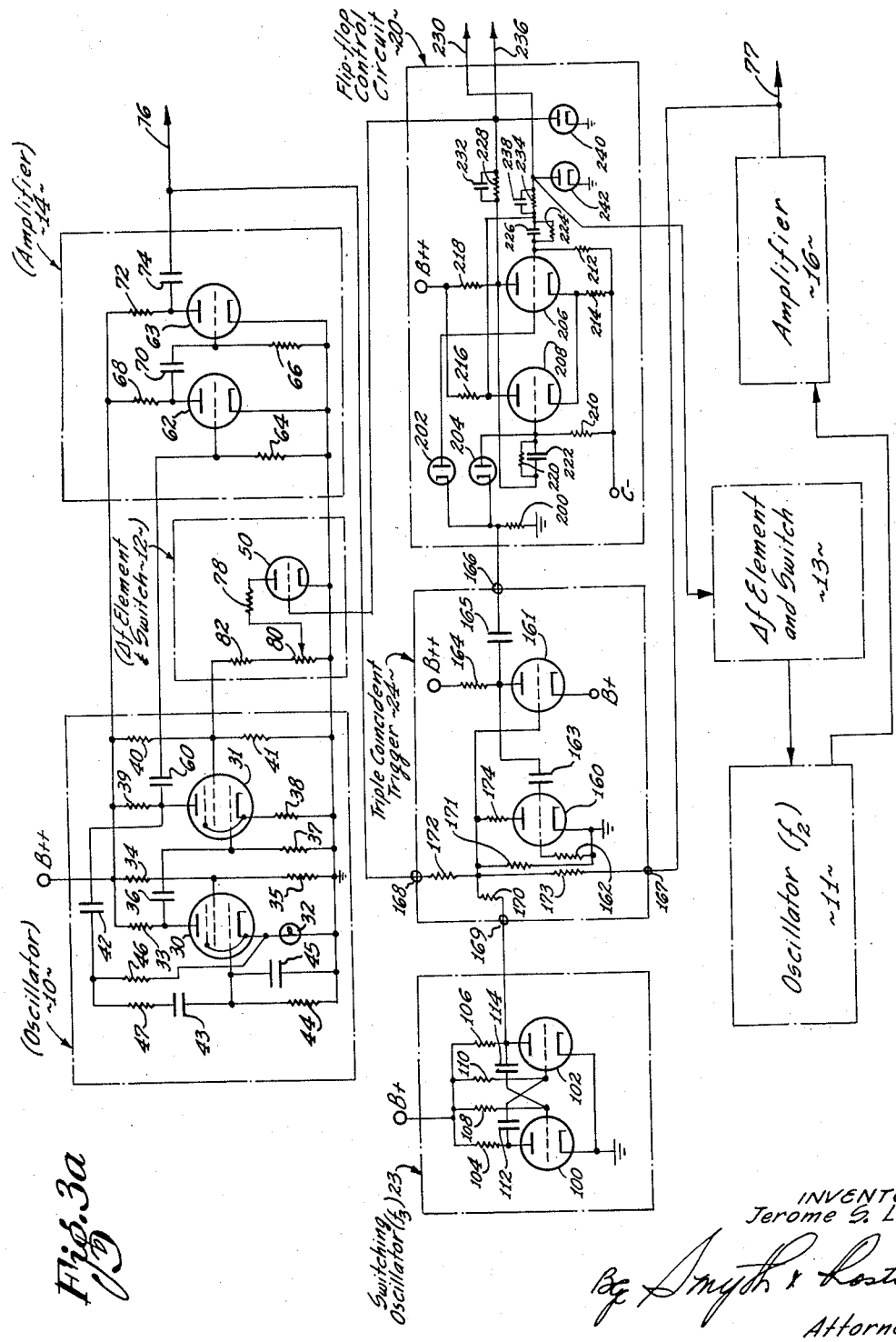

Oct. 27, 1959 J. S. LINN 2,910,638
SPEED CONTROL SYSTEM
Filed July 15, 1957 3 Sheets-Sheet 3

INVENTOR:
Jerome G. Linn

Attorneys

United States Patent Office 2,910,638
Patented Oct. 27, 1959

2,910,638

SPEED CONTROL SYSTEM

Jerome S. Linn., Los Angeles, Calif., assignor to Genisco, Inc., Los Angeles, Calif., a corporation Application July 15, 1957, Serial No. 672,091

13 Claims. (Cl. 318—318)

The present invention relates to an electric drive and control system for a variable speed rotary mechanism, and it is directed more particularly to a control system for making such a mechanism adjustable by exceedingly small increments down to zero under a close and accurate control.

While the invention may be employed for various specific purposes and in conjunction with instrumentalities having a wide range of speeds, it is eminently suited for use in conjunction with a variable speed turntable for testing rotation-responsive instruments such as gyroscopes.

The present application is a continuation-in-part of copending application Serial No. 576,207, which was filed April 4, 1956, in the name of Jerome S. Linn, which has been assigned to the assignee of the present application, and which now has been abandoned.

Mechanical coupling arrangements have been used in the past for controlling the drive of a turntable for the purpose mentioned above, and such drives have generally been satisfactory. However, there is a problem of bearing friction in these drives for the lower speeds, and there is a difficulty in adjusting such drives down to zero speed due to mechanical tolerances. Also, mechanical coupling arrangements have exhibited some instability at speeds approaching zero.

The present invention provides an electronic system which can be used to control the type of apparatus referred to above, and it is a general object of the invention to provide an improved electronic control system that overcomes the disadvantages inherent in the mechanical arrangements described above.

One major requirement in turntable systems of the type used for testing gyroscopes and the like is that they be rotated at an extremely low rate of speed, and that such rotation be extremely stable. A suitable driving means for such a turntable is a differential motor (or two motors connected as such). This type of motor responds to the frequency difference of a pair of applied signals to drive its rotating member at a speed which is proportional to the frequency differential. Therefore, by using two driving currents for the motor of different frequencies, and by varying the frequency of one or both of these currents so that they approach one another, it would be expected that an adequate control could be devised for precisely and accurately controlling the motor down through zero speed. However, even though the frequencies of the individual driving currents themselves may be highly stable, the difference-frequency between these currents, on which the motor speed is dependent, has been found to be unstable especially when this frequency approaches zero.

The present invention overcomes the limitations of the prior art in that it provides an improved electronic drive for a rotary mechanism, which drive is extremely stable so that the rotary mechanism may be accurately and precisely controlled down to zero speed. This control of the rotary mechanism is effectuated by the system of the invention without the requirement for mechanical linkages, or the like, so that a direct drive for the rotary mechanism may be used.

The control system of the invention is also advantageous in that it is constructed in a relatively simple and straightforward manner, and in that it uses conventional and readily available component parts.

The features of the invention which are believed to be new are set forth with particularity in the claims. The invention itself, however, together with its further objects and advantages, may best be understood by reference to the following description when taken in conjunction with the accompanying drawings, in which:

Figures 3a and 3b are circuit diagrams representative of the system of Figure 1.

The invention provides a driving system having a first oscillator for generating a selected frequency during spaced operating intervals and for generating a selected frequency plus an incremental frequency during interposed intervals. The system also has a second generator for generating a selected frequency plus an incremental frequency during the spaced operating intervals and for generating the latter selected frequency during the interposed intervals.

First and second frequency dividers are provided in the drive system, and respective switching means connect the first oscillator to the first divider and the second oscillator to the second divider during the spaced operating intervals, and the switching means reverse the connections of the oscillators to the dividers during the interposed intervals. A differential motor assembly, or other mechanism, may be connected to the frequency dividers to respond to the outputs of the dividers and obtain a desired controllable rotational speed for the motor.

Figure 1:
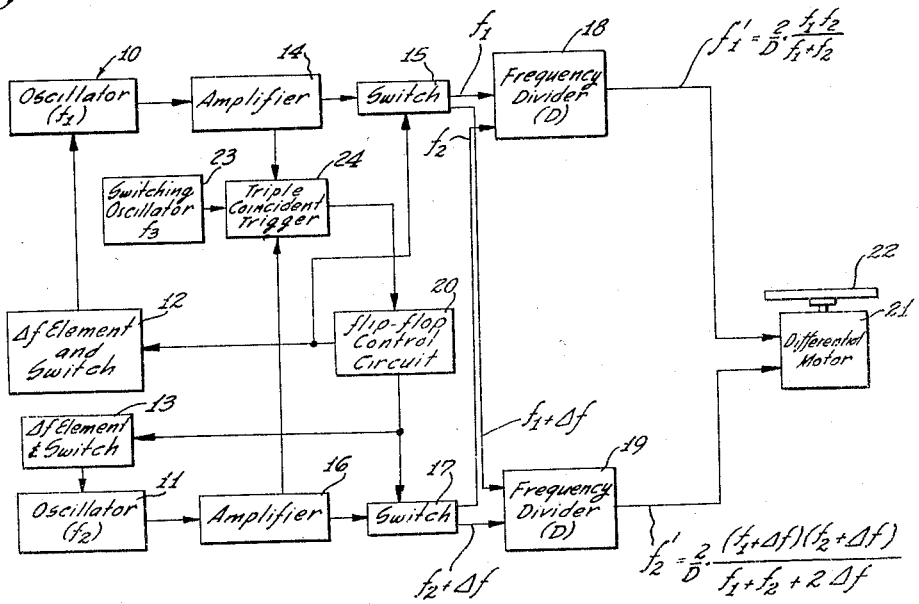
Figure 1 is a block diagram of the drive and control system of the present invention.

Referring now to Figure 1, the illustrated system includes a first oscillator 10 for generating a signal having a first selected frequency ($f_1$). The system also includes a second oscillator 11 for generating a second signal having a selected frequency ($f_2$). A unit 12 is coupled to the oscillator 10, and this unit is so constituted that it may be actuated to switch a frequency changing element into the circuit of the oscillator 10 to cause the frequency ($f_1$) of its output signal to be changed by a selected and adjustable increment ($\Delta f$). Likewise, a unit 13 is provided which is coupled to the oscillator 11 to cause that oscillator to change the frequency of its output signal by the same selected increment ($\Delta f$) upon actuation of the unit 13.

By appropriately controlling the operation of the units 12 and 13, the oscillator 10 can be made to generate an output signal of the frequency ($f_1$) during spaced operating intervals and the oscillator 11 can be made to generate the frequency ($f_2+\Delta f$) during the same intervals. Also, during interposed intervals, the oscillator 10 can be made to generate the frequency ($f_1+\Delta f$) and the oscillator 11 may be made to generate the frequency ($f_2$).

The oscillator 10 is coupled through a suitable amplifier 14 to an electronic switch 15, and the oscillator 11 is coupled through a suitable amplifier 16 to an electronic switch 17. The switch 15 is a single-pole double-throw type, and it has its common input terminal connected to the output of the amplifier 14. The two output terminals of the switch 15 are connected respectively to a frequency divider 18 and to a frequency divider 19.

The switch 17 is also a single-pole double-throw switch. The latter switch has its common input terminal connected to the output of the amplifier 16, and it has its output terminals connected respectively to the frequency dividers 18 and 19.

The switches 15 and 17 are controlled by an electronic flip-flop control circuit 20. This control circuit responds to a control signal which is introduced to it in a manner to be described, and the control circuit responds to such a control signal to actuate the switches 15 and 17 between their two operating conditions. The control circuit 20 is also connected to the frequency-switching units 12 and 13. The arrangement is such that during the spaced operating intervals when the system is in a first operating condition, the oscillator 10 generates an output signal having a frequency ($f_1$) and the oscillator 11 generates an output signal having a frequency ($f_2 + \Delta f$).

During this first operating condition of the system, the switch 15 connects the output of the amplifier 14 to the frequency divider 18 and the switch 17 connects the output of the amplifier 16 to the frequency divider 19. During the interposed operating intervals the system is in a second operating condition in which the oscillator 10 generates a signal having a frequency ($f_1 + \Delta f$) and the oscillator 11 generates a signal having a frequency ($f_2$). During these interposed operating intervals, the switch 15 connects the amplifier 14 to the frequency divider 19 and the switch 17 connects the amplifier 16 to the frequency divider 18.

Therefore, during the spaced operating intervals of the first operating condition of the system, the frequency divider 18 receives a signal having a frequency ($f_1$) and the frequency divider 19 receives a signal having a frequency ($f_2 + \Delta f$). During the interposed operating intervals, on the other hand, the divider 18 receives a signal having a frequency ($f_2$) and the divider 19 receives a signal having the frequency ($f_1 + \Delta f$).

Both the frequency dividers 18 and 19 may be constructed to impart the same frequency division (D) to the signals introduced to them. The output signal from the frequency divider 18 has an average frequency represented by:

$$f_1' = \frac{2}{D} \cdot \frac{f_1 f_2}{f_1 + f_2} \quad (1)$$

The frequency divider 19, on the other hand, produces an output signal having an average frequency represented by:

$$f_2' = \frac{2}{D} \cdot \frac{(f_1 + \Delta f)(f_2 + \Delta f)}{f_1 + f_2 + 2\Delta f} \quad (2)$$

The frequency dividers are connected to a differential motor that is constructed in a known manner to respond to the two signals impressed on it to develop a rotational speed to the turntable 22 that is determined by the frequency difference between the two signals. As discussed previously, it is not sufficient to apply merely two stable frequency signals to the differential motor 21, because of the inherent instability that arises in the difference frequency when the frequencies of these two signals approach coincidence with one another. That is, for the extremely slow speeds required in some applications, it is necessary for the frequencies of the applied signals to be essentially the same. This has been found to produce instability when prior art techniques were used.

In accordance with the present invention, the output signals from the frequency dividers 18 and 19 have a complex frequency relationship and the difference between the frequencies of these two signals has been found to be a function of ($\Delta f$). This means that the frequency which determines the speed of the turntable 22 corresponds to the incremental frequency imparted to the oscillators 10 and 11.

It has also been found that the stability of the system actually increases as the incremental frequency is brought nearer and nearer to zero for the extremely slow speeds required by the turntable 22. In a preferred embodiment of the invention, the system was constructed so that ($f_1$) may be made equal to ($f_2$). This provides that the difference frequency ($f'_1 - f'_2$) introduced to the motor is a function only of D and ($\Delta f$) for greater inherent accuracy and stability in the system.

A convenient frequency for ($f_1$) has been found to be of the order of 6000 cycles, and for ($f_2$) to be equal to ($f_1$) and also of the order of 6000 cycles. By an appropriate frequency division in the frequency dividers 18 and 19, the drive motor is driven by the frequency ($f'_1$) of 60 cycles and ($f'_2$) of $$60 + \frac{(\Delta f)}{D}$$

cycles. It has also been found convenient to actuate the flip-flop control circuit 20 at approximately one-tenth the frequency of the oscillators 10 and 11, and this control circuit is controlled by a switching oscillator 23. The switching oscillator is coupled to the control circuit 20 in a manner to be described, and it develops the desired switching signal having a frequency ($f_3$) for controlling the control circuit 20 at the desired rate.

The amplifiers 14 and 16 are designed to operate between a cut-off and a saturated condition so that they transform the signals from the oscillators 10 and 11 into signals having a pulse or rectangular wave form. These signals, as amplified by the amplifiers, are used as the driving current of the system.

Assuming that the frequency dividers 18 and 19 respond only to negative pulses, it is evident that should the control circuit 20 switch the system during the incidence of a negative portion of the signal from the oscillator 10 or from the oscillator 11, a second spurious actuation of a frequency divider would occur after the switching operation which would give a spurious frequency division in one of the channels. To obviate this condition, a triple coincident trigger circuit 24 is interposed between the switching oscillator 23 and the control circuit 20. This circuit 24 assures that the control circuit 20 will be operated only when the rectangular signals from the amplifier 14 and from the amplifier 16 are both in the positive portion of a cycle. This assures that there will be no spurious division by either of the frequency dividers 18 or 19. Also, to assure that there will be times when the signals from the two oscillators are coincidentally positive, even though they recur at the same frequency (as in the preferred embodiment), the signals are given an asymmetrical wave form with a longer positive portion, for example, in each cycle, as compared with the corresponding negative portion.

Figure 2:
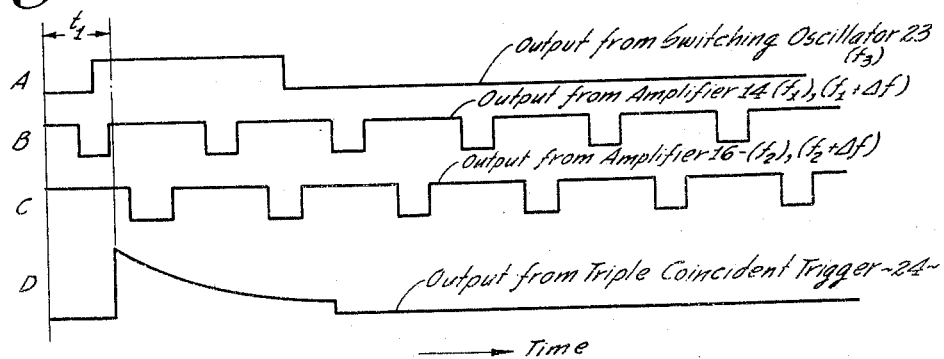
Figure 2 is a series of curves useful in describing the operation of a portion of the control system of Figure 1.

The operation of the trigger circuit 24 may be best understood by reference to the curves of Figure 2. The curve A in Figure 2 shows a typical switching signal generated by the switching oscillator 23, this switching signal having a positive portion which is much shorter than its negative portion. If this signal were applied directly to the control circuit 20, the leading edge of its positive portion would cause the control circuit to actuate the switches 15 and 17. However, this would occur in the middle of the negative portion of a cycle from the amplifier 14 (curve B) which would result in a spurious actuation of the frequency divider 18.

The trigger circuit 24, however, is merely conditioned by the positive portion of the signal from the oscillator 23, and it does not pass a pulse to the flip-flop control circuit 20 until there is a coincidence between a positive portion of the signal from the amplifier 14 and a positive portion of the signal from the amplifier 16. The rectangular output signal from the amplifier 14 is shown in the curve B of Figure 2 and the rectangular signal from the amplifier 16 is shown in the curve C. It will be noted that the first coincidence between the positive portions of the signals from the amplifier 14 and from the amplifier 16, after the initiation of a positive portion of the signal from the oscillator 23, occurs at a time $t_1$. At this time $t_1$, the trigger circuit 24 causes a pulse (which is shown in the curve D) to be applied to the flip-flop control circuit 20, and the leading edge of this pulse triggers the flip-flop 20. Therefore, the switching operation occurs at a time when the pulse output from the amplifiers 14 and 16 is positive. This assures that there will be no spurious operation of the frequency dividers 18 or 19, since these frequency dividers respond only to negative pulses.

Figure 3B:
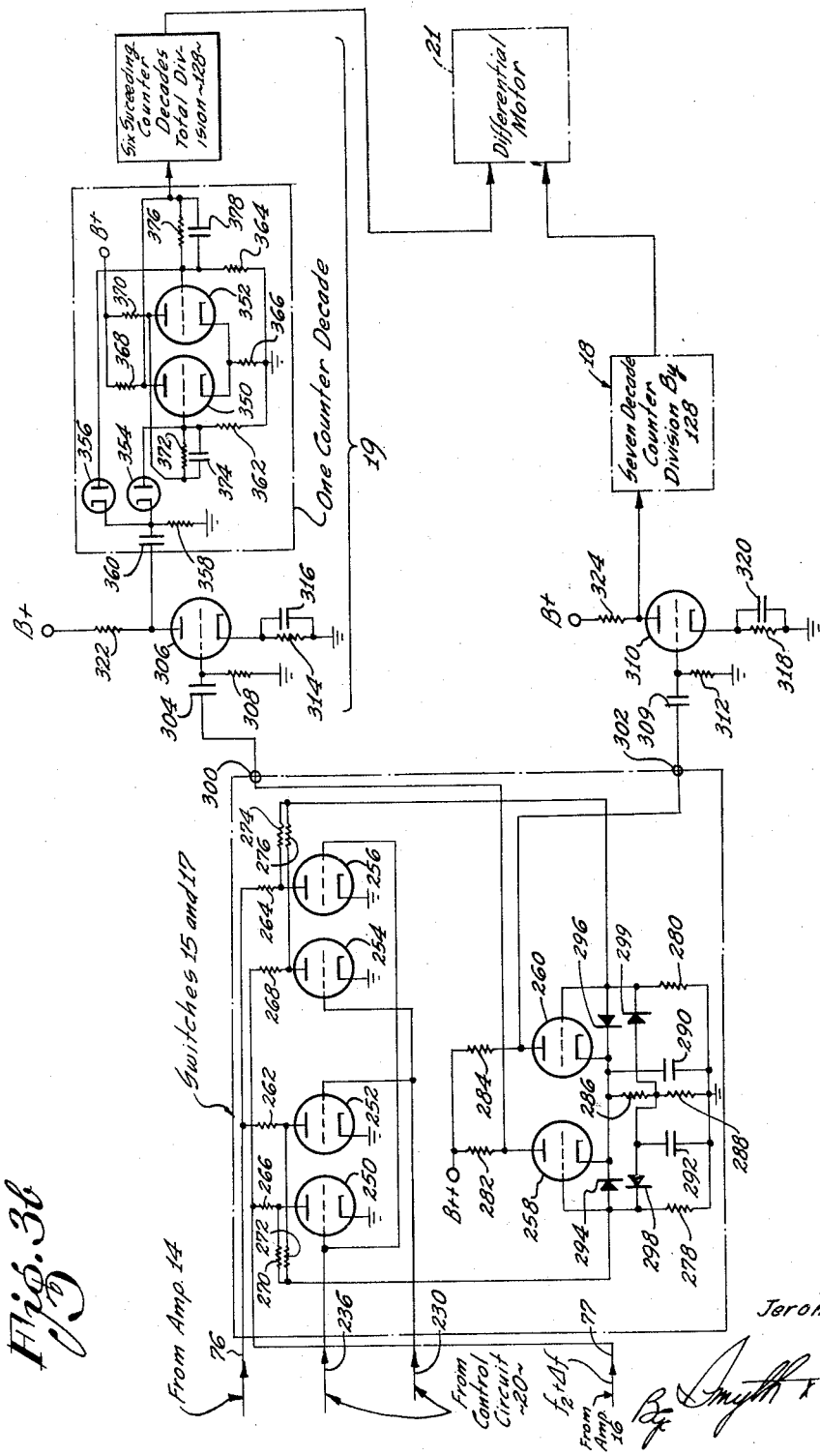

Appropriate circuitry for making up the various components shown in block form in Figure 1 is set forth in detail in Figures 3a and 3b. The differential motor 21 may be of any known type, and the particular structure of this motor need not be described further in the present case. Copending application Serial No. 645,072, filed March 11, 1957 in the name of Andrew Bekey, now U.S. Patent No. 2,896,143, issued July 21, 1959, for example, discloses an improved type of differential motor that may be adapted to be controlled by the system of the present invention.

Although the oscillators 10 and 11 may be of the known Wien bridge type, their use in the present system and the selective switching of the ($\Delta f$) element in these oscillators is unusual and a suitable circuit for the oscillators is shown in Figure 3a. The triple coincident trigger circuit 24 is also somewhat unusual and a suitable circuit for this component is also shown in Figure 3a. The amplifiers 14 and 16 may be any suitable type of saturated amplifier, and an appropriate circuit for these components is shown in Figure 3a. Figure 3a also shows an appropriate circuit for the switching oscillator 23, this circuit being a multivibrator type of pulse generator. Likewise, a bi-stable flip-flop circuit is shown in that figure to constitute the control circuit 20.

The circuit of the oscillator 10 in Figure 3a includes a pair of pentodes 30 and 31. These pentodes may be of the type presently designated as 6BA6. As previously noted, the pentodes 30 and 31 are connected as a Wien bridge oscillator. A 3-watt, 120-volt lamp 32 is connected between the cathode of the device 30 and ground to constitute a voltage stabilizer.

The anode of the pentode 30 is connected to the positive terminal of a source of direct voltage by means of a resistor 33. This positive terminal is designated as B++ in Figure 3a, and the value of this voltage may be of the order of 260 volts. The resistor 33, for example, may have a resistance of 56 kilo-ohms.

The pentode 30 also has a screen grid which is connected to the junction of a pair of resistors 34 and 35, these resistors connected in series between the positive terminal B++ and ground. The resistor 34 may have a value of 220 kilo-ohms, and the resistor 35 may have a value of 100 kilo-ohms. The pentode 30 also has a suppressor grid which is connected to its cathode.

The anode of the pentode 30 is connected to a condenser 36 which, in turn, is connected to the control grid of the pentode 31. The condenser 36 has a capacity of .02 microfarad. The control grid of the pentode 31 is connected to a grounded resistor 37 having, for example, a resistance of 560 kilo-ohms. A resistor 38 is connected between the cathode of the pentode 31 and ground. The resistor 38 may have a resistance of 1.2 kilo-ohms. The anode of the pentode 31 is connected to a resistor 39 which, in turn, is connected to the positive terminal B++. The resistor 39 has a resistance, for example, of 47 kilo-ohms. The pentode 31 also has a suppressor grid which is connected to its cathode, and the pentode has a screen grid which is connected to the junction of a pair of resistors 40 and 41. The latter resistors are connected in series between the positive terminal B++ and ground. The resistor 40 may have a resistance of 160 kilo-ohms and the resistor 41 may have a resistance of 100 kilo-ohms.

The anode of the pentode 31 is coupled back to the control grid of the pentode 30 through a network including a capacitor 42, a resistor 47 and a capacitor 43, all these elements being connected in series. The capacitor 42 may have a capacity of .1 microfarad, the resistor 47 may have a resistance of 22 kilo-ohms, and the capacitor 43 may have a capacity of 100 micro-microfarads.

The anode of the pentode 31 is also returned through the condenser 42 and through a resistor 46 to the cathode of the pentode 30. The resistor 46 may have a resistance of 3 kilo-ohms. A grounded resistor 44 is connected to the control grid of the pentode 30, and this resistor is shunted by a capacitor 45. The resistor 44 may have a resistance of 47 kilo-ohms, and the capacitor 45 may have a capacity of 100 micro-microfarads.

The operation of the oscillator circuit described above is known. Briefly, the resistance and capacity values of the various resistors and condensers in the circuit are such that the signals fed back to the grid and to the cathode of the pentode 30 by the pentode 31 have the proper phase to sustain oscillation in the circuit at one particular frequency only. An inherent feature of this type of oscillator is the extreme sharpness of its feedback characteristics which provides highly stable frequency operation.

A capacitor 60 couples the anode of the pentode 30 to the control grid of a triode 62. The triode 62 and an additional triode 63 make up the amplifier and wave shaper 14 of Figure 1. It will be evident that a similar circuit can be used for the amplifier and wave shaper 16. The triodes 62 and 63 may be enclosed in a single envelope to constitute a dual tube of the type presently designated as a 12AX7. The capacitor 60 may have a capacity of .02 microfarad.

A grounded resistor 64 is connected to the control grid of the triode 62, and a grounded resistor 66 is connected to the control grid of the triode 63. Each of these resistors may have a resistance of 560 kilo-ohms. The cathodes of the triodes 62 and 63 are grounded. The anode of the triode 62 is connected to one terminal of a resistor 68, the other terminal of this resistor being connected to the positive terminal B++ of the source of direct voltage. The value of this resistor may be of the order of 150 kilo-ohms. A .02 microfarad capacitor 70 couples the anode of the triode 62 of the control grid of the triode 63. A capacitor 72 is connected between the anode of the triode 63 and the positive terminal B++. The value of this latter resistor may be 150 kilo-ohms.

A capacitor 74 of, for example, .02 microfarad is connected to the anode of the triode 63 and to a lead designated 76. The amplifier and wave shaper 14 is connected so that it operates between a cut-off and a saturation point to produce a square wave output on the lead 76. This output is designated by the curve B of Figure 2.

The ($\Delta f$) element and switch unit 12 of Figure 1 includes a triode 50. The cathode of this triode is grounded, and its anode is connected to one terminal of a resistor 78. The resistor 78 has a resistance of the order of 22 kilo-ohms. The other terminal of the resistor 78 is connected to the armature of a 150 kilo-ohm potentiometer 80. One of the fixed terminals of the potentiometer 80 is grounded, and its other fixed terminal is connected to a resistor 82. The resistor 82 is connected to the screen grid of the device 31, and it has a resistance of the order of 220 kilo-ohms.

A manual adjustment of the potentiometer 80 controls the voltage on the screen grid of the device 31 which, in turn, controls the gain of that device. As is well known in oscillator circuits of the type described, a variation in the gain of the device 31 varies the operating frequency of the oscillator. Therefore, the manual adjustment of the potentiometer 80 provides a convenient means to adjust the frequency of the oscillator 10. The change in the conduction of the triode 50 between a fully conductive and a non-conductive state causes a variation in the gain of the device 31. This in turn, produces the desired frequency shift ($\Delta f$) in the oscillator. The amount of this frequency shift may be controlled by an adjustment of the armature of the potentiometer 80.

That is, the connections are such that when the control circuit 20 is actuated by the switching oscillator 23 to one of its operating conditions it renders the triode 50 conductive, and when the control circuit is actuated by the switching oscillator to its other operating condition it renders the triode 50 non-conductive. The potentiometer 80 places additional resistance in the oscillator circuit to control the net operating frequency. Therefore, as long as the triode 50 is non-conductive, the oscillator will oscillate at the selected frequency $f_1$. However, when the triode 50 is rendered conductive it, in effect, places the resistor 78 in parallel with a controllable portion of the potentiometer 80, as determined by the position of the armature of the potentiometer. This produces an adjustable incremental frequency change ($\Delta f$) in the oscillator, the change being relatively small when the armature is at the bottom of the potentiometer and relatively large when it is at the top.

It can be seen, therefore, that by the adjustment of the armature of the potentiometer 80, and by the use of similar elements in the unit 13, that the alternate operation of the units 12 and 13 by the control circuit 20 can cause first the oscillator 10 to have an increment of ($\Delta f$) imparted to its frequency $f_1$, and then the oscillator 11 to have the same increment ($\Delta f$) imparted to its frequency $f_2$. Therefore, the armature of the potentiometer 80 when mechanically coupled to a similar armature in the unit 13 forms a convenient means for controlling ($\Delta f$) which, in turn, determines the speed of the motor 21. This control is capable of adjusting the speed of the motor down to zero by extremely small increments, the control being extremely accurate and stable.

The switching oscillator 23, as noted above, may be any appropriate multivibrator type of pulse generator. This circuit may include a pair of triodes 100 and 102 which may be combined into a single envelope to constitute a dual type of tube such as is presently designated as a 12AU7. The cathodes of the triodes 100 and 102 are connected to ground. A resistor 104 connects the anode of the triode 100 to the positive terminal B+ of a source of direct voltage. This voltage may have a value of, for example, 160 volts, and the resistor 104 may have a resistance of 47 kilo-ohms. A like resistor 106 connects the anode of the triode 102 to the positive terminal B+.

The control grid of the triode 100 is connected to a resistor 108, and the control grid of the triode 102 is connected to a resistor 110. The resistors 108 and 110 may each have a resistance of 1 megohm, and these resistors are each connected to the positive terminal B+. A capacitor 112 is connected between the triode 100 and the control grid of the triode 102. In like manner, a capacitor 114 is connected between the anode of the triode 102 and the control grid of the triode 100. The capacitor 112 may have a capacity of .001 microfarad, and the capacitor 114 may have a capacity of .002 microfarad.

The parameters of the switching oscillator are chosen so that the oscillator will generate an output signal of the type shown in the curve A of Figure 2. As stated above, it is desirable that the frequency of this signal be approximately one-tenth that of the oscillators 10 and 11. Also, and in order that the positive portion of the output signal from the oscillator may be relatively short as compared with the negative portion, the capacitors 112 and 114 have the indicated capacity values. In well known manner, the multivibrator oscillator circuit of the triodes 100 and 102 is self-triggered from one operating condition to another to generate the required output switching signal.

The triple coincident trigger circuit 24 includes a triode 160 and a triode 161. The triode 160 has its cathode directly connected to ground, and the triode 161 has its cathode connected to the positive terminal B+ of a source of direct voltage of, for example, 75 volts. The control grid of the triode 160 is connected to a grounded resistor 162, and this control grid is also connected to a capacitor 163 which, in turn, is connected to the anode of the triode 161. The anode of the triode 161 is further connected to a resistor 164 which is connected to the positive terminal B++ of a source of direct voltage of the order of 160 volts. A capacitor 165 is coupled between the anode of the triode 161 and an output terminal 166.

The coincident circuit has three input terminals 167, 168, and 169, and these input terminals are connected respectively to the output of the amplifier 16, to the output of the amplifier 14, and to the output of the switching oscillator 23. The connection from the amplifier 14 to the input terminal 168 is made from the lead 76. A like connection is made from a lead 77 from the amplifier 16 to the input terminal 167. Finally, the connection to the input terminal 169 is made from the anode of the triode 102 of the switching oscillator 23.

The input terminal 169 is connected to a resistor 170, the input terminal 168 is connected to a resistor 172, and the input terminal 167 is connected to a resistor 173. The resistors 170, 172 and 173 are all connected together and to a grounded resistor 171. A resistor 174 connects the anode of the triode 160 to the common junction of the resistors 170, 171, 172 and 173. This common junction is also connected to the control grid of the triode 161.

In the absence of applied signals to the input terminals 167, 168 and 169, the triode 160 is conductive and the triode 161 is non-conductive. The triode 161 cannot be made conductive until the time $t_1$ has elapsed in Figure 2 and when all three signals introduced to the input terminals 167, 168 and 169 are at the positive portion of their cycles. When the triode 161 is made conductive, the resulting voltage drop across its anode resistor 164 drives the control grid of the triode 160 in the negative direction due to the coupling through the capacitor 163. This makes the triode 160 non-conductive for a time determined by the time constant of the capacitor 163 and its associated circuit resistance. This time constant is made longer than the positive portion of the switching signal $f_3$ of curve A of Figure 2. For the period when the triode 160 is non-conductive the input impedance to the control grid of the triode 161 is effectively raised and the triode 160 remains non-conductive as long as any one of the three signals is positive. At the end of the period, the triode 160 again becomes conductive and the triode 161 is rendered non-conductive until the next simultaneous occurrence of the positive portions of the three input signals. Therefore, the trigger circuit 24 will pass a pulse such as shown by the curve D of Figure 2 once only during each operating cycle of the switching oscillator and only after the signals introduced to the coincident circuit by the amplifiers 14 and 16 are coincidentally in the positive portions of their cycles.

In a constructed embodiment of the triple coincident trigger circuit 24, the following constants were used, and these are listed merely by way of example:

| | | |
|---|---|---|
| Capacitor 163 | micro-microfarads | 250 |
| Resistor 170 | megohms | 1.5 |
| Resistor 172 | do | 1.5 |
| Resistor 171 | kilo-ohms | 680 |
| Resistor 162 | do | 470 |
| Resistor 174 | do | 220 |
| Resistor 164 | do | 120 |
| Capacitor 165 | micro-microfarads | 250 |
| Triodes 160 and 161 | | 12AX7 |

The output terminal 166 of the triple coincident trigger 24 is connected to the common junction of a grounded resistor 200 and the cathodes of a pair of diodes 202 and 204. The resistor 200 may have a resistance of 68 kilo-ohms, and the diodes may be included in a dual tube such as a 6AL5.

The anode of the diode 202 is connected to the control grid of a triode 206, and the anode of the diode 204 is connected to the control grid of a triode 208. The triodes 206 and 208 may be included in a single envelope to constitute a dual tube of the type presently designated as a 12AU7.

A resistor 210 is connected between the control grid of the triode 208 and the negative terminal C— of a source of direct voltage. This source may, for example, have a value of 75 volts. A resistor 212 is connected between the control grid of the triode 206 and the negative terminal C—. The resistors 210 and 212 may each have a value of 220 kilo-ohms. A 15 kilo-ohm resistor 214 is connected between the cathodes of the triodes 206 and 208 and the negative terminal C—.

A resistor 216 is connected to the anode of the triode 208 and a resistor 218 is connected to the anode of the triode 206. Both these resistors are connected to the positive terminal B++ of a source of positive voltage which may have a value of 260 volts. The resistors 216 and 218 may each have a resistance of 100 kilo-ohms.

A resistor 220 is connected between the anode of the triode 206 and the control grid of the triode 208. This resistor is shunted by a capacitor 222. In like manner, a resistor 224 is connected between the control grid of the triode 206 and the anode of the triode 208. This latter resistor is shunted by a capacitor 226. The resistors 220 and 224 may each have a resistance of 470 kilo-ohms, and the capacitor 222 and 226 may each have a capacity of 47 micro-microfarads.

A resistor 228 connects the anode of the triode 206 to a lead 236, and this resistor is shunted by a capacitor 232. Likewise, a resistor 234 connects the anode of the triode 208 to a lead 230, this latter resistor being shunted by a capacitor 238. The resistors 228 and 234 may each have a resistance of 220 kilo-ohms, and the capacitors 232 and 238 may each have a capacity of 200 micro-microfarads.

A clamping diode 240 has its anode connected to the lead 230 and has its cathode connected to ground. Likewise, a clamping diode 242 has its anode connected to the lead 236 and also has a grounded cathode. Both the diodes 240 and 242 may be included in a single envelope to constitute a dual diode of the type presently designated as a 6AL5.

The lead 230 is connected to the control grid of the triode 50 to control the frequency of the oscillator 10 in the manner described above. The lead 236, on the other hand, is connected to the control grid of a similar control tube in the unit 13 to control the frequency of the oscillator 11 in like manner.

The circuit of the triodes 206 and 208 will be recognized as a usual bi-stable flip-flop network. Whenever the triple coincident trigger 24 develops a negative pulse across the resistor 200, the diodes 202 and 204 are rendered conductive. In one operating condition, the triode 208 is conductive and the triode 206 is non-conductive. The resulting conductivity of the diodes 202 and 204 drives the control grid of the triodes in a negative direction so as to cause the triode 208 to become non-conductive and reverse the stable state of the network. Alternately, in a second operating condition, the triode 206 is conductive and the triode 208 is non-conductive. For the latter condition, the conductivity of the diodes causes the triode 206 to become conductive and the triode 208 to be non-conductive. Therefore, regardless of the operating condition of the flip-flop control circuit 20, the production of a negative pulse across the resistor 200 causes it to assume its other operating condition. This operation of the flip-flop is well known.

When the flip-flop control circuit 20 is in its first operating condition in which the triode 206 is non-conductive, the resulting relatively high voltage at the anode of this triode causes the triode 50 in the unit 12 to be conductive to provide the described frequency shift to the oscillator 10. At this time, the triode 208 is conductive so that the oscillator 11 is controlled by the unit 13 to produce its frequency ($f_2$).

However, when the flip-flop control circuit 20 is triggered to its second operational state, the triode 206 becomes conductive and the resulting low voltage at its anode causes the triode 50 to become non-conductive so that the oscillator 10 returns to its original frequency ($f_1$). At the same time, the resulting relatively high voltage at the anode of the now non-conductive triode 208 causes the unit 13 to shift the frequency of the oscillator 11 by the selected increment ($\Delta f$). In this manner, the actuation of the control circuit 20 between one or the other of its stable operating conditions causes the frequency of the output pulses from the amplifiers 14 and 16 to be alternately shifted by a selected increment ($\Delta f$) and in the manner described.

A suitable circuit for the switches 15 and 17 of Figure 1 is shown in Figure 3b. This circuit includes a group of four triodes 250, 252, 254 and 256. It further includes a pair of triodes 258 and 260. This pair of triodes is connected in a manner to be described to constitute a clipper portion of the switching circuit. The triodes 258 and 260 may be included in a single envelope and constitute a dual triode of the type designated 12AX7.

The lead 76 from the amplifier 14 is connected to a pair of resistors 262 and 264. The resistor 262 is connected to the anode of the triode 252 and the resistor 264 is connected to the anode of the triode 256. These resistors 262 and 264 may each have a resistance of 470 kilo-ohms.

The triodes 250 and 252 may be included in a single envelope, as may be the triodes 254 and 256. Each of these pairs of triodes may constitute a dual tube of the type presently designated as a 12AU7.

The lead 77 from the amplifier 16 is connected to a resistor 266 and to a resistor 268. Each of these resistors may have a value of 470 kilo-ohms, and they are connected respectively to the anodes of the triodes 250 and 254. The lead 236 from the control circuit 20 of Figure 3a is connected to the control grid of the triode 250 and to the control grid of the triode 256. In like manner, the lead 230 from the control circuit 20 is connected to the control grid of the triode 252 and to the control grid of the triode 254. The cathodes of all these triodes are grounded.

A resistor 270 connects the anode of the triode 250 to the control grid of the triode 258, and a resistor 272 connects the anode of the triode 252 to that control grid. Each of the resistors 270 and 272 may have a value of 470 kilo-ohms. In like manner, a resistor 274 connects the anode of the triode 254 to the control grid of the triode 260, and a resistor 276 connects the anode of the triode 256 to that control grid. Each of the resistors 274 and 276 may have a resistance of 470 kilo-ohms.

The control grid of the triode 258 is connected to a grounded resistor 278, and the control grid of the triode 260 is connected to a grounded resistor 280. The resistors 278 and 280 may each have a resistance of 47 kilo-ohms. The anode of the triode 258 is connected to a resistor 282, and the anode of the triode 260 is connected to a resistor 284. Each of these resistors may have a resistance of 1 megohm, and each is connected to the positive terminal B++ of a source of direct voltage. This voltage may, for example, be 260 volts.

A pair of series connected resistors 286 and 288 is connected from the cathodes of the triodes 258 and 260 to ground. The resistor 286 may have a resistance of 560 ohms, and the resistor 288 may have a resistance of 10 kilo-ohms. The resistors 286 and 288 are shunted by the capacitor 290, and the resistor 288 itself is shunted by a capacitor 292. Each of these capacitors may have a capacity of .02 microfarad.

A first diode 294 has its anode connected to the control grid of the triode 258 and its cathode connected to the cathode of that triode. Likewise, a diode 296 has its anode connected to the control grid of the triode 260 and its cathode connected to the cathode of that triode. Similarly, a diode 298 has its cathode connected to the control grid of the triode 258 and has its anode connected to the junction of the resistors 286 and 288. Finally, a diode 299 has its anode connected to the common junction of the resistors 286 and 288, and it has its cathode connected to the control grid of the triode 260. Each of the diodes 294, 296, 298 and 299 may be of the dry rectifier type as presently designated 1N54A.

The triodes 258 and 260 are connected in known manner as a top and bottom clipper circuit. This clipper circuit assures that the pulses translated by the switching circuit will have a rectangular wave form and be free from undesired transient components.

When the control circuit 20 of Figure 3a is in a first operational state such that a relatively low voltage appears on the lead 230 and a relatively high voltage appears on the lead 236, the triodes 252 and 254 are rendered nonconductive; the triode 256 is placed in such a condition that it conducts for the positive half-cycles of the rectangular signal from the amplifier 14 which appears on the lead 76; and at the same time, the triode 250 is established in a condition such that it conducts on the positive half-cycles of the rectangular wave appearing on the lead 77 from the amplifier 16. During this first operational state of the control circuit 20, the oscillator 11 of Figure 3a has its frequency shifted by the increment ($\Delta f$) and the oscillator 10 is oscillating at its original frequency ($f_1$).

The non-conductivity of the triode 252 causes the signal from the amplifier 14 to be translated to the triode 258. The signal is clipped in the circuit of the triode 258 and introduced to the output terminal 300 of the switching circuit. In like manner, the signal from the amplifier 16 is translated to the triode 260 due to the non-conductivity of the triode 254 and the latter signal appears at the output terminal 302 of the switching circuit. The conductive triode 256 however, prevents the signal from the amplifier 14 from being applied to the triode 260, and the conductive triode 250 prevents the signal from the amplifier 16 from being applied to the triode 258.

For this first operational state of the control circuit 20, therefore, the signal ($f_1$) appears at the output terminal 300 and the signal ($f_2+\Delta f$) appears at the output terminal 302.

Now, for the second operational state of the control circuit 20 of Figure 3a, the oscillator 10 assumes its frequency ($f_1+\Delta f$), and the oscillator 11 assumes the frequency ($f_2$). Now we have a relatively low voltage on the lead 236 and a relatively high voltage on the lead 230. The triode 254 is now conductive to the positive half-cycles of the signal from the amplifier 16, and the triode 252 is now conductive to the positive half-cycles of the signal from the amplifier 14. The triodes 250 and 256 are now rendered non-conductive.

Therefore, the signal from the amplifier 14 is now introduced to the triode 260 to be translated in clipped form by that triode to the output terminal 302. Likewise, the signal from the amplifier 16 is now translated by the triode 250 to the triode 258. This latter signal appears in clipped form at the output terminal 300. Therefore, for this second operational state of the control circuit 20, the signal ($f_2$) appears at the output terminal 300 and the signal ($f_1+\Delta f$) appears at the output terminal 302.

The output terminal 300, therefore, produces the signals which are to be introduced to the frequency divider 19 of Figure 1, and the output terminal 302 provides the signals which are to be introduced to the frequency divider 18 of Figure 1.

A coupling capacity 304 of .01 microfarad couples the output terminal 300 to the control grid of a triode 306. A resistor 308 connects this control grid to ground, and this resistor may have a resistance of 1 megohm. Likewise, a .01 microfarad coupling capacitor 309 couples the output terminal 302 to the control grid of a triode 310, and this latter control grid is connected to a grounded resistor 312. The resistor 312 may also have a resistance of 1 megohm. The triodes 306 and 310 are connected as individual pre-amplifier circuits, and they may be enclosed in a single envelope so as to constitute a type 6J6 common cathode, dual triode discharge tube.

A resistor 314 is connected between the cathode of the triode 306 and ground, and this resistor is shunted by a capacitor 316. Likewise, a resistor 318 is connected between the control grid of the triode 310 and ground, and the latter resistor is shunted by a capacitor 320. The resistors 314 and 318 may each have a resistance of 5.6 kilo-ohms, and the capacitors 306 and 320 may each have a capacity of .02 microfarad.

A resistor 322 is connected between the anode of the triode 306 and the positive terminal B+ of a source of direct voltage of, for example, 160 volts. A similar capacitor 324 is connected between the anode of the triode 310 and the positive terminal B+ of that source. The resistors 322 and 324 may each have a value of 100 kilo-ohms.

The frequency dividers 18 and 19 may be, for example, electronic counter networks of known construction. For example, each of these frequency dividers may be a seven decade counter to provide a total frequency division of 128. The circuitry of one of the counter decades of the frequency divider 19 is shown in Figure 3b. It is evident that the other decades of the divider 19, and decades of the frequency divider 18, may have similar connections.

The decade shown in circuit form in Figure 3b includes a first triode 350 and a second triode 352. These triodes may be incorporated in a single envelope to constitute a dual tube of the type presently designated as a 6J6. The control grid of the triode 350 is connected to the anode of a diode 354, and the control grid of the triode 352 is connected to the anode of a diode 356. The diodes 354 and 356 may be combined to constitute a dual tube such as the type presently designated as a 6AL5.

The cathodes of the diodes 354 and 356 are each connected to a grounded resistor 358 of, for example, 680 kilo-ohms. The ungrounded terminal of the resistor 358 is connected to a coupling capacitor 360 which, in turn, is connected to the anode of the triode 306. The capacitor 360 has a capacity of, for example, 200 micromicrofarads.

The control grid of the triode 350 is connected to a grounded resistor 362, and the control grid of the triode 352 is connected to a grounded resistor 364. The resistors 362 and 364 may each have a resistance of 220 kilo-ohms. A common resistor 366 connects the cathodes of the triodes 350 and 352 to ground, and this latter resistor may have a resistance of 22 kilo-ohms.

The anode of the triode 350 is connected to one terminal of a resistor 368, and the anode of the triode 352 is connected to one terminal of a resistor 370. The resistors 368 and 370 may each have a value of 100-kilo-ohms, and each is connected to the positive terminal B+ of a source of direct voltage having a value, for example, of 160 volts.

A resistor 372 connects the anode of the triode 352 to the control grid of the triode 350, and this resistor is shunted by a capacitor 374. Likewise, a resistor 376 connects the anode of the triode 350 to the control grid of the triode 352, this latter resistor being shunted by a capacitor 378. The resistors 372 and 376 may each have a resistance of 470 kilo-ohms, and the capacitors 374 and 378 may each have a capacity of 47 micro-microfarads.

The circuit of the triodes 350 and 352 will be recognized as a bi-stable flip-flop circuit similar to that of the control circuit 20. In a manner known to the art, the flip-flop circuit of the triodes 350 and 352 is triggered by negative pulses appearing across the resistor 358. In accordance with known counter arrangements, the succeeding stage is arranged to be triggered only by every second pulse, and so on, until the desired frequency division is obtained.

As noted above, the output terminals of the frequency dividers 18 and 19 are connected to the differential motor 21.

Although the disclosed type of frequency dividers are of the counter type, it is obvious that other frequency dividers may be used. For example, under certain conditions it has been found that the single stage multivibrator type of frequency divider operates satisfactorily to provide the desired frequency division.

The invention provides, therefore, an electrical control for an electric motor which permits the motor to be brought to an extremely low speed while exhibiting extreme stability at such low speeds. As previously noted, the motor speed can be controlled by the potentiometer 80 of Figure 3a and by a like potentiometer in the unit 13, and it is the incremental frequency produced in the oscillators rather than the frequencies of the oscillators themselves that determines the net motor speed.

The control enables the speed of the turntable 22 shown coupled to the motor 21 in Figure 1 to be precisely controlled down to zero. The turntable is directly driven by the motor 21 so that no mechanical linkages are required. In addition, the entire control system uses readily available and relatively inexpensive component parts.

Although the now preferred embodiment of the present invention has been shown and described herein, it is to be understood that the invention is not to be limited thereto, for it is susceptible to changes in form and detail within the scope of the appended claims.

I claim:

1. A difference-frequency generator including in combination: a first oscillator for generating a first signal during successive first operating intervals having a selected frequency; a second oscillator for generating a second signal during successive second operating intervals having a selected frequency; means for changing the frequency of the signal from said first oscillator by a selected amount during said second operating intervals and for changing the frequency of the signal from said second oscillator by a selected amount during said first operating interval; first and second output circuit means; means for connecting said first oscillator to said first output circuit means and said second oscillator to said second output circuit means during said first operating intervals, and for connecting said first oscillator to said second output circuit means and said second oscillator to said first output circuit means during said second operating intervals; and means for connecting a utilizing means to said first and second output circuit means.

2. The difference-frequency generator defined in claim 1 in which said first and second output circuit means each comprises a frequency divider.

3. A difference-frequency generator including in combination: a first oscillator for generating a first signal having a selected frequency ($f_1$); a second oscillator for generating a second signal having a frequency ($f_2$); control means having a first operational state for imparting a frequency increment to said first oscillator and having a second operational state for imparting a frequency increment to said second oscillator; first and second frequency dividers; a first switching means for connecting said first oscillator to said first frequency divider during said second operational state of said control means and for connecting said first oscillator to said second frequency divider during said first operational state of said control means; a second switching means for connecting said second oscillator to said first frequency divider during said first operational state of said control means and for connecting said second oscillator to said second frequency divider during said second operational state thereof; a circuit for actuating said control means during spaced operating intervals to actuate said control means between said first operational state and said second operational state; and means for supplying the output signals from said first and second frequency dividers to a utilizing means.

4. A difference-frequency generator including in combination: a first oscillator for generating a signal having a frequency ($f_1$) during spaced operating intervals and for generating a signal having a frequency ($f_1+\Delta f$) during interposed operating intervals; a second oscillator for generating a signal having a frequency ($f_2+\Delta f$) during said spaced operating intervals and for generating a signal having a frequency ($f_2$) during said interposed intervals; first and second output circuit means; and switching means for connecting said first oscillator to said first output circuit means and said second oscillator to said second output circuit means during said spaced operating intervals, and said switching means connecting said first oscillator to said second output circuit means and said second oscillator to said first output circuit means during said interposed operating intervals.

5. A drive system including in combination: a first oscillator for generating a signal having frequency ($f_1$) during spaced operating intervals and for generating a signal having a frequency ($f_1+\Delta f$) during interposed operating intervals; a second oscillator for generating a signal having a frequency ($f_2+\Delta f$) during said spaced operating intervals and for generating a signal having a frequency ($f_2$) during said interposed intervals; first and second frequency dividers; means for connecting said first oscillator to said first frequency divider and said second oscillator to said second frequency divider during said spaced operating intervals; and for connecting said first oscillator to said second frequency divider and said second oscillator to said first frequency divider during said interposed operating intervals; and differential electric motor means coupled to said first and second frequency dividers to be energized by output signals therefrom and in accordance with the frequency difference of such output signals.

6. A drive system including in combination: a first oscillator for generating a first signal having a frequency ($f_1$); a second oscillator for generating a second signal having a frequency ($f_2$); means for producing a third signal having a frequency ($f_1+\Delta f_1$); means for producing a fourth signal having a frequency ($f_2+\Delta f_2$); first and second output circuit means; means for introducing said first and second signals to said first output circuit means to derive an output signal having an average frequency which is a function of $$\frac{(f_1 f_2)}{f_1+f_2}$$

means for introducing said third and fourth signals to said second output circuit means to derive a second output signal having an average frequency which is a function of $$\frac{(f_1+\Delta f_1)(f_2+\Delta f_2)}{f_1+\Delta f_1+f_2+\Delta f_2}$$

and differential electric motor means coupled to said first and second output circuit means to be energized by said first and second output signals therefrom and in accordance with the frequency difference thereof.

7. A drive system including in combination: a first oscillator for generating a first signal having a frequency $(f_1)$ during spaced operating intervals and for generating a second signal having a frequency $(f_1+\Delta f)$ during interposed operating intervals; a second oscillator for generating a third signal having a frequency $(f_2+\Delta f)$ during said spaced operating intervals and for generating a fourth signal having a frequency $(f_2)$ during said interposed intervals; first and second frequency dividers each imparting a frequency division (D) to signals introduced thereto; means for connecting said first oscillator to said first frequency divider during said spaced operating intervals and said second oscillator to said first frequency divider during said interposed operating intervals to obtain a first output signal having an average frequency $$\left(\frac{2}{D} \cdot \frac{f_1 f_2}{f_1+f_2}\right)$$

and for connecting said first oscillator to said second frequency divider during said interposed operating intervals and said second oscillator to said second frequency divider during said spaced operating intervals to obtain a second output signal having an average frequency $$\left(\frac{2}{D} \cdot \frac{(f_2+\Delta f)(f_1+\Delta f)}{f_1+f_2+2\Delta f}\right)$$

and differential electric motor means coupled to said first and second frequency dividers to be energized by said first and second output signals therefrom and in accordance with the frequency difference of such output signals.

8. A drive system including in combination: a first oscillator for generating a first signal having a frequency $(f_1)$; a second oscillator for generating a second signal having a frequency $(f_2)$; control means for imparting a selected frequency change to said first oscillator during a first operating condition and for imparting a selected frequency change to said second oscillator during a second operating condition; first and second frequency dividers; first switching means for connecting said first oscillator to said first frequency divider during said second operating condition of said control means and for connecting said first oscillator to said second frequency divider during said first operating condition thereof; second switching means for connecting said second oscillator to said first frequency divider during said first operating condition of said control means and for connecting said second oscillator to said second frequency divider during said second operating condition thereof; circuit means for actuating said control means during spaced operating intervals to actuate said control means between said first operating condition and said second operating condition; and differential motor means coupled to said first and second frequency dividers and utilizing the output signals therefrom to be actuated in accordance with the frequency difference of such output signals.

9. The drive system of claim 8 which further includes a signal-coincident circuit interposed between said circuit means and said control means, said coincident circuit being coupled to said first and second oscillators for introducing an actuating signal to said control means only when the signals from said oscillators have a selected polarity.

10. A drive system including in combination: a first oscillator for generating a first signal having a frequency $(f_1)$; a second oscillator for generating a second signal having a frequency $(f_1)$; control means for imparting a selected frequency change $(\Delta f)$ to said first oscillator during a first operating condition and for imparting a selected frequency change $(\Delta f)$ to said second oscillator during a second operating condition; first and second frequency dividers each imparting a frequency division (D) to signals introduced thereto; first switching means for connecting said first oscillator to said first frequency divider during said second operating condition of said control means and for connecting said first oscillator to said second frequency divider during said first operating condition thereof; second switching means for connecting said second oscillator to said first frequency divider during said first operating condition of said control means and for connecting said second oscillator to said second frequency divider during said second operating condition thereof; said first frequency divider developing a first output signal having an average frequency $$\left(\frac{2}{D} \cdot \frac{f_1 \cdot f_2}{f_1+f_2}\right)$$

and said second frequency divider developing a second output signal having an average frequency $$\left(\frac{2}{D} \cdot \frac{(f_1+\Delta f)(f_2+\Delta f)}{f_1+f_2+2\Delta f}\right)$$

circuit means for actuating said control means during spaced operating intervals between said first operating condition and said second operating condition; a signal-coincident circuit interposed between said circuit means and said control means, said coincident circuit being coupled to said first and second oscillators for introducing an actuating signal to said control means only when the signals from said oscillators have a selected polarity; and differential motor means coupled to said first and second frequency dividers and utilizing said first and second output signals to be energized in accordance with the frequency difference between such output signals.

11. The frequency-difference generator defined in claim 10 in which the frequency $(f_1)$ is substantially equal to the frequency $(f_2)$.

12. A difference-frequency generator including: first means for generating a first constant-frequency signal, second means for generating a second constant-frequency signal, first means for causing a first controllable-frequency signal to be produced having a frequency displaced from the frequency of the first constant-frequency signal by a selected frequency differential, second means for causing a second controllable-frequency signal to be produced having a frequency displaced from the frequency of the second constant-frequency signal by a selected frequency differential, a first output circuit means coupled to the first and second generating means and responsive to the first constant-frequency signal and to the second constant-frequency signal for producing a first output signal having a frequency bearing a particular relationship to the frequencies of the first and second constant-frequency signals, a second output circuit means responsive to a pair of input signals introduced thereto for producing a second output signal having a frequency bearing a particular relationship to the frequency of the input signals introduced thereto, means for introducing the first controllable-frequency signal and the second controllable-frequency signal to the second output circuit means, and means for coupling a differential utilizing means to said first and second output circuit means to control the utilizing means in accordance with the frequency difference of the first and second output signals.

13. A difference-frequency generator including: first means for generating a first constant-frequency signal having a frequency $(f_1)$, second means for generating a second constant-frequency signal having a frequency $(f_2)$, first means for causing a first controllable-frequency signal to be produced having a frequency displaced from the frequency $(f_1)$ by a selected frequency differential $(\Delta f)$, second means for causing a second controllable-frequency signal to be produced having a frequency displaced from the frequency $(f_2)$ by a selected frequency differential $(\Delta f)$, a first output circuit frequency divider means coupled to the first and second generating means for imparting a frequency division (D) to the signals introduced thereto and responsive to the first constant-frequency signal and to the second constant-frequency signal for producing a first output signal having a frequency $$\left(f_1' = \frac{2}{D} \cdot \frac{f_1 f_2}{f_1 + f_2}\right)$$

a second output circuit frequency divider means for imparting the frequency division (D) to signals introduced thereto, means for introducing the first controllable-frequency signal and the second controllable-frequency signal to the second output circuit frequency divider means to cause the same to produce a second output signal having a frequency $$\left(f_2' = \frac{2}{D} \cdot \frac{(f_1 + \Delta f)(f_2 + \Delta f)}{(f_1 + \Delta f) + (f_2 + \Delta f)}\right)$$

and means for coupling a differential utilizing means to said first and second output circuit frequency divider means to control the utilizing means in accordance with the frequency difference of the first and second output signals.

References Cited in the file of this patent

UNITED STATES PATENTS

| | | |
|---|---|---|
| 2,408,451 | Sorensen | Oct. 1, 1946 |
| 2,429,427 | Rieber | Oct. 21, 1947 |
| 2,643,330 | Borgeson | June 23, 1953 |
| 2,691,733 | MacSorley | Oct. 12, 1954 |